United States Patent
Lai et al.

(10) Patent No.: US 6,512,574 B2
(45) Date of Patent: Jan. 28, 2003

(54) LIGHT RECEIVING CIRCUIT OF LASER RANGE FINDER

(75) Inventors: I-Jen Lai, Taichung (TW); Pi-Yao Chien, Taichung (TW); Jui-Feng Huang, Taichung (TW); Chih-Wei Hung, Nan Tou Hsien (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 09/780,364

(22) Filed: Feb. 12, 2001

(65) Prior Publication Data

US 2002/0033937 A1 Mar. 21, 2002

(30) Foreign Application Priority Data

Sep. 11, 2000 (TW) ........................................ 89118577 A

(51) Int. Cl.[7] ................................................. G01C 3/08
(52) U.S. Cl. ..................................................... 356/4.01
(58) Field of Search ................................ 356/4.01–5.15

(56) References Cited

U.S. PATENT DOCUMENTS

| | | | | |
|---|---|---|---|---|
| 3,644,740 A | | 2/1972 | Dobratz et al. | |
| 3,959,641 A | | 5/1976 | Miller, Jr. et al. | |
| 4,569,599 A | | 2/1986 | Bölkow et al. | |
| 4,678,323 A | * | 7/1987 | Sato et al. | 356/4 |
| 4,681,432 A | * | 7/1987 | Kawabata et al. | 356/4 |
| 4,770,526 A | | 9/1988 | Manhart et al. | |
| 5,357,331 A | * | 10/1994 | Flockencier | 356/5 |
| 5,396,510 A | * | 3/1995 | Wilson | 372/38 |
| 5,612,779 A | | 3/1997 | Dunne | |
| 5,767,953 A | * | 6/1998 | McEwan | 356/5.01 |
| 6,103,546 A | * | 8/2000 | Lee | 438/57 |
| 6,115,114 A | * | 9/2000 | Berg et al. | 356/5.13 |
| 6,259,321 B1 | * | 7/2001 | Song et al. | 330/254 |
| 6,310,682 B1 | * | 10/2001 | Gavish et al. | 356/5.01 |

* cited by examiner

Primary Examiner—Thomas H. Tarcza
Assistant Examiner—Brian Andrea
(74) Attorney, Agent, or Firm—Browdy and Neimark

(57) ABSTRACT

A light receiving circuit of a laser range finder comprises a photo-sensitive element, a conversion resistance amplifying loop, a main amplification loop, and a one shot circuit. The photo-sensitive element converts a light signal into a current signal. The conversion resistance amplifying loop is connected with the photo-sensitive element for converting the current signal into a voltage signal. The main amplification loop is connected with the conversion resistance amplifying loop for amplifying the voltage signal. The one shot loop is connected with the main amplification loop for shaping the voltage signal into a digital signal by which the range-finding computation is accomplished by the laser range finder.

9 Claims, 3 Drawing Sheets

LIGHT RECEIVING CIRCUIT OF LASER RANGE FINDER

FIELD OF THE INVENTION

The present invention relates generally to a device of distance measurement based on laser, and more particularly to a light receiving circuit of the laser range finder.

BACKGROUND OF THE INVENTION

Laser range finder is one of the important devices for measuring the distance. Traditionally, a laser range finder employs a pulse type of the laser transmitter to transmit short laser pulse of about 20 ns onto a target. The reflected laser signal from the target is received by employing a low noise, high sensitivity laser receiver to evaluate the distance by the following formula:

$$T_d = 2L/C, \quad (1)$$

Where L is the distance, C is the speed of light, and $T_d$ is time delay between the firing laser pulse and received laser pulse. A precise distance can be obtained by measuring $T_d$ according to the formula (1). In order to precisely measure the time delay $T_d$, it needs to increase the transmitted laser power as much as possible or to remove the noise induced by the sunlight in the optical receiver. U.S. Pat. No. 3,644,740 discloses that the signal-to-noise ratio of the receive circuit is improved by controlling the circuit bias on the receiver circuit to get a fixed false alarm. With reference to U.S Pat. No. 4,569,599, a timing control technique is disclosed to detect the distance signal. U.S. Pat. No. 4,770,526 further discloses a technique of amplifying time delay signal to increase the resolution of distance detection. A technique of digital ranging is also disclosed in U.S. Pat. No. 3,959,641 to reduce the threshold value of the optical receiver so as to increase the measured distance.

U.S. Pat. No. 5,612,779 uses an automatic noise threshold determining circuit to get a maximum sensitivity of the laser receiver. A fast charge and slow discharge circuit is also adopted to improve the distance resolution.

In this invention, we will propose a light receiving receiver with a bias stabilized main amplifier followed by a one-shot circuit to get a digital output signal with fixed pulse width. This light receiver circuit can provide a function of maximum sensitivity for the laser receiving circuit, therefore the ranging distance of the laser range finder can also be improved effectively.

SUMMARY OF THE INVENTION

The primary objective of the present invention is to provide a laser range finder with light receiving circuit capable of enhancing the sensitivity of the receiving laser signal.

The light-receiving circuit of the laser range finder of the present invention comprises a photosensitive element, a conversion amplifier, a main amplifier, and a one-shot circuit. The photosensitive element converts a received light signal into a current signal, which is then converted into a voltage signal by the conversion amplifier. A main amplifier to get amplification with very high gain then amplifies the output voltage signal of conversion amplifier. The one-shot circuit into a digital signal with fixed pulse width then shapes the output voltage of the main amplifier. This digital signal is then adopted for using in the range-finding process of the laser range finder.

DETAILED DESCRIPTION OF THE INVENTION

Figure 1:
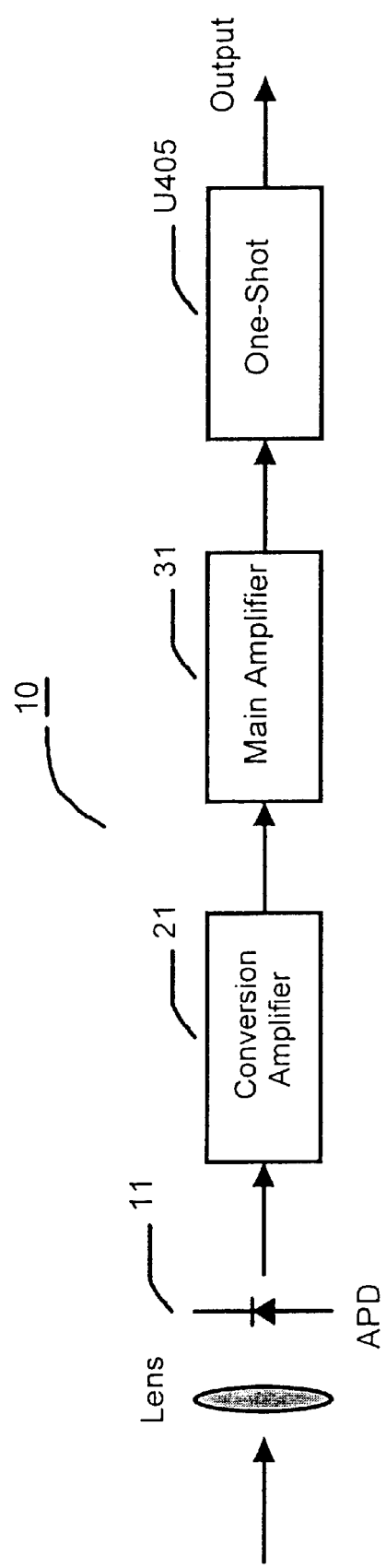
FIG. 1 shows a circuit block diagram of a preferred embodiment of the present invention.
Figure 2:
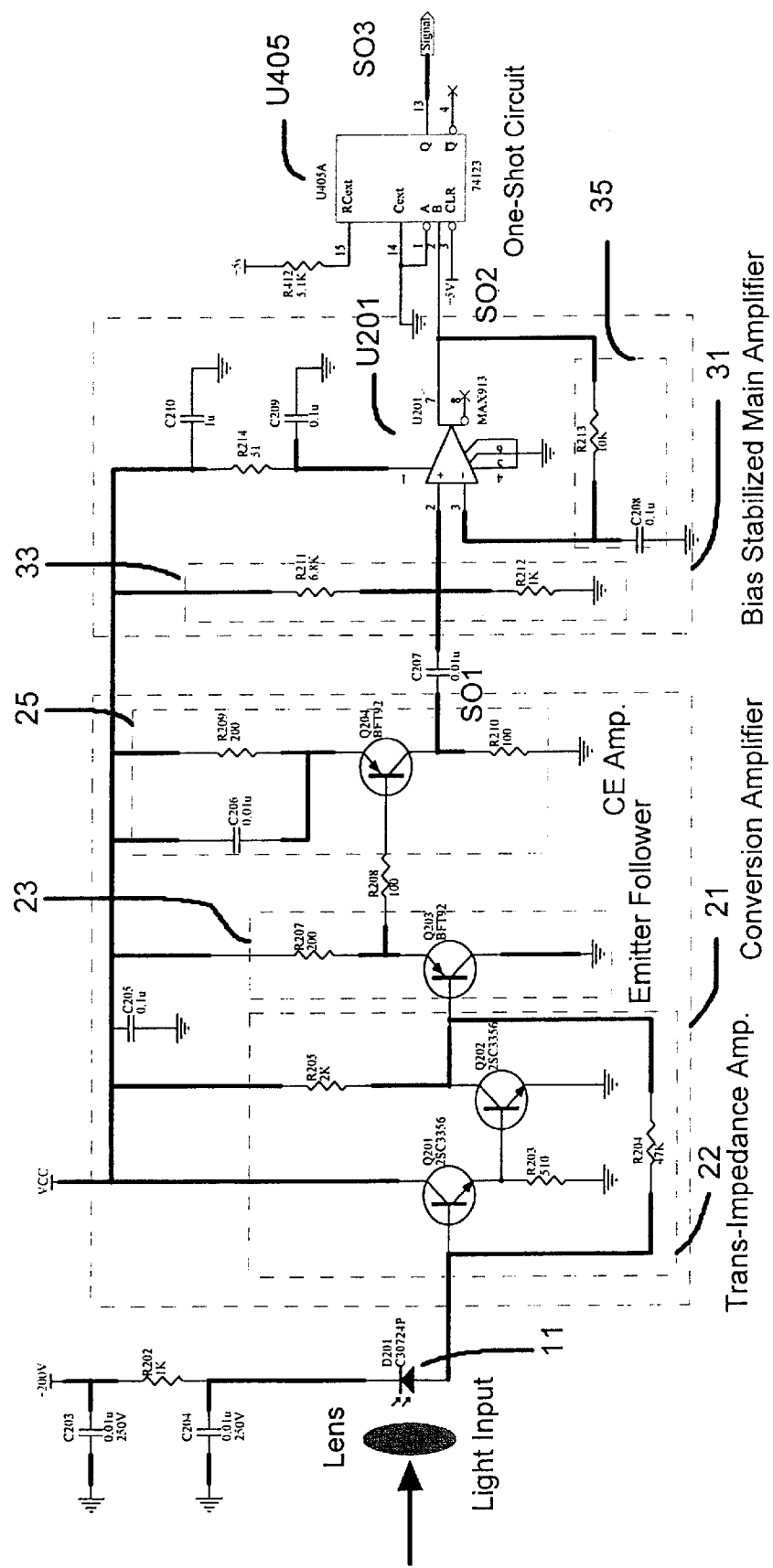
FIG. 2 shows a circuit structural view of the preferred embodiment of the present invention.

As shown in FIG. 1 and FIG. 2, a light receiving circuit 10 embodied in the present invention is used in a laser range finder and is formed of a photosensitive element 11, a conversion amplifier 21, a bias stabilized main amplifier 31, and a one-shot circuit (U405).

The photosensitive element 11 is an avalanche photo-detector (APD). The APD is biased with negative bias to get the high internal gain of 100 times and is outputted a current signal when receiving a laser signal reflected by a target.

The conversion amplifier 21 has a trans-impedance amplifier 22, which is formed of two transistors Q201, Q202 and two resistors R203, R205. The trans-impedance amplifier 22 is connected to the photosensitive element 11 for converting the current signal in APD into voltage through a conversion resistor R204. The transistor Q203 and the resistor R207 form an emitter follower 23, which is connected with the trans-impedance amplifier 22. In the meantime, the transistor Q204, the resistors R209, R210 and the capacitor C206 form a common emitter amplifier 25, which is connected with the emitter follower 23. The output signal of the common emitter amplifier 25 is gone through to the bias stabilized main amplifier 31.

The bias stabilized main amplifier 31 has a main amplifier U201, and a plurality of resistors and capacitors. A bias stabilization loops 33 formed of resistor R211 and R212 supplies the stable bias to the main amplifier U201. The direct current bias of the input end of the main amplifier U201 is adjusted by the output of the main amplifier U201 via a low pass filter 35, which is formed of resistor R213 and capacitor C208. As a result, the DC bias of the main amplifier U201 is stabilized and is not affected by the temperature variation induced bias point drift in main amplifier U201.

The one-shot circuit U405 of the preferred embodiment of the present invention is an integrated circuit, which is connected to the bias stabilized main amplifier 31. The one-shot circuit U405 is used for shaping the output signal of the bias stabilized main amplifier 31 into a digital pulse having a predetermined width, and the digital pulses are serially arranged before being transmitted.

Figure 3:
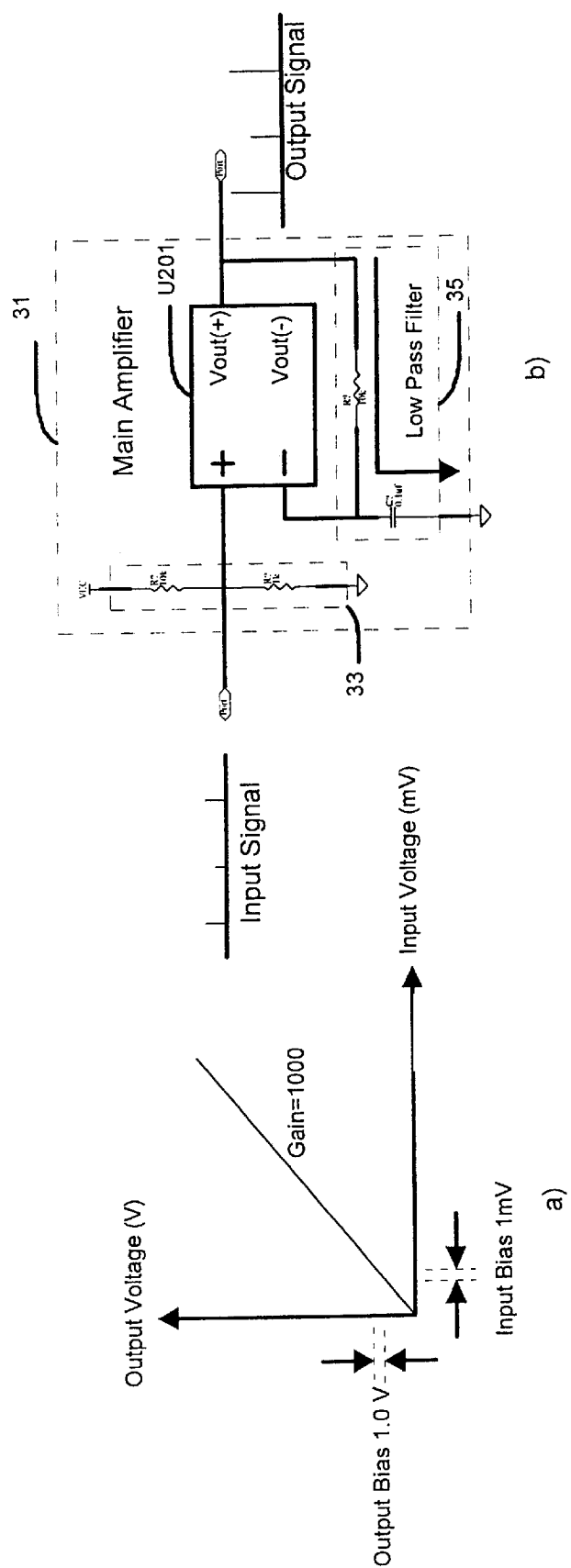
FIG. 3 shows a characteristic description of the main amplifier of the preferred embodiment of the present invention.

FIG. 3 shows an input-to-output characteristic of the main amplifier U201 with gain of 1000. When the input bias point has been changed with a small value of 1 mV, then the output of U201 will produce an amount of 1.0 V change. As a result, the one-shot circuit U405 will be erroneously triggered. In order to avoid such an error produced by the one-shot loop, a stable bias is provided by the bias stabilization loop 33. When the bias of the input end + of the main amplifier U201 rises, the output end Vout (+) of the main amplifier U201 also rises. The low-pass filter 35 formed by resistor R213 and capacitor C208 secures the DC bias value of Vout (+), so as to raise the bias of the input end–. As a result, the DC bias value of Vout (+) is kept constant.

The present invention minimizes the voltage drift in main amplifier to enhance the receiving sensitivity of the laser signal reflected from target. In operation, the present invention is connected with the circuit of the laser range finder such that the laser signal reflected from a target is amplified by a high magnification into the electronic signal and is shaped by the one- shot loop. According to the electronic signal, the laser range finder can measure distance between a target and range finder.

What is claimed is:

1. A light receiving circuit of a laser range finder, said light receiving circuit comprising:
    a photosensitive element for converting a light signal into a current signal;
    a conversion amplifier connected with said photosensitive element for converting the current signal outputted from said photosensitive element into a voltage signal;
    a main amplifier connected with the conversion amplifier for amplifying the output voltage signal from the conversion amplifier;
    a one-shot circuit connected with the main amplifier for shaping the output voltage signal from the main amplifier into a digital signal by which the range-finding computation is attained by the laser range finder; and
    a bias stabilizing loop which is connected with said conversion amplifier and said main amplifier for enabling the output signal of said conversion amplifier to have a constant bias value.

2. The light receiving circuit as defined in claim 1, wherein said photosensitive element is an avalanche photo-detector having a negative bias upon receiving a light signal, thereby resulting in an internal gain and a current output signal.

3. The light receiving circuit as defined in claim 2, wherein said internal gain of said avalanche photo-detector is 100.

4. The light receiving circuit as defined in claim 1, wherein said main amplifier has a gain of 1000.

5. The light receiving circuit as defined in claim 1, wherein said bias stabilizing loop is connected to the output of said conversion amplifier.

6. The light receiving circuit as defined in claim 5, wherein said main amplifier comprises a feedback loop containing a low pass filter that operates to cause said main amplifier to produce an output signal having a constant bias level.

7. A light receiving circuit of a laser range finder, said light receiving circuit comprising:
    a photosensitive element for converting a light signal into a current signal;
    a conversion amplifier connected with said photosensitive element for converting the current signal outputted from the photosensitive element into a voltage signal;
    a main amplifier connected with the conversion amplifier for amplifying the output voltage signal from the conversion amplifier; and
    a one-shot circuit connected with the main amplifier for shaping the output voltage signal from the main amplifier into a digital signal by which the range-finding computation is attained by the laser range finder,
wherein said main amplifier is a bias stabilized amplifier.

8. The light receiving circuit as defined in claim 7, further comprising a bias stabilizing loop which is connected between said conversion amplifier and said main amplifier for causing said main amplifier to be bias stabilized.

9. The light receiving circuit as defined in claim 8, wherein said main amplifier comprises a feedback loop containing a low pass filter that operates to cause said main amplifier to produce an output signal having a constant bias level.

* * * * *